United States Patent
Kim et al.

(10) Patent No.: US 8,319,907 B2
(45) Date of Patent: Nov. 27, 2012

(54) CONDENSING FILM FOR LCD BACKLIGHT UNIT

(75) Inventors: Kyung Mo Kim, Daejeon (KR); Kwang Seung Park, Daejeon (KR); Jin Hyun Kim, Daejeon (KR); Sang Choll Han, Daejeon (KR)

(73) Assignee: LG Chem, Ltd., Seoul (KR)

( * ) Notice: Subject to any disclaimer, the term of this patent is extended or adjusted under 35 U.S.C. 154(b) by 274 days.

(21) Appl. No.: 12/450,374

(22) PCT Filed: Aug. 13, 2008

(86) PCT No.: PCT/KR2008/004714
§ 371 (c)(1),
(2), (4) Date: Sep. 23, 2009

(87) PCT Pub. No.: WO2009/022862
PCT Pub. Date: Feb. 19, 2009

(65) Prior Publication Data
US 2010/0045897 A1      Feb. 25, 2010

(30) Foreign Application Priority Data

Aug. 14, 2007   (KR) .................. 10-2007-0081944
Aug. 13, 2008   (KR) .................. 10-2008-0079402

(51) Int. Cl.
*G02F 1/1335* (2006.01)
*G02F 1/1333* (2006.01)
(52) U.S. Cl. .......................................... 349/57; 349/54
(58) Field of Classification Search ............ 349/54, 349/57
See application file for complete search history.

(56) References Cited

U.S. PATENT DOCUMENTS

| | | | | |
|---|---|---|---|---|
| 5,566,007 | A * | 10/1996 | Ikeda et al. | 349/5 |
| 6,102,545 | A * | 8/2000 | Ogino | 353/38 |
| 7,309,149 | B2 | 12/2007 | Lee et al. | |
| 7,821,717 | B2 * | 10/2010 | Woodgate et al. | 359/622 |
| 2003/0164679 | A1 * | 9/2003 | Hamano et al. | 313/504 |
| 2006/0279953 | A1 | 12/2006 | Kim et al. | |
| 2007/0177079 | A1 * | 8/2007 | Yoshikawa et al. | 349/114 |
| 2008/0296793 | A1 * | 12/2008 | Ogawa et al. | 264/1.34 |
| 2009/0122576 | A1 * | 5/2009 | Sato et al. | 362/620 |
| 2009/0168187 | A1 * | 7/2009 | Woodgate et al. | 359/623 |
| 2010/0165619 | A1 * | 7/2010 | Kawato et al. | 362/235 |

FOREIGN PATENT DOCUMENTS

| | | |
|---|---|---|
| CN | 1877371 | 12/2006 |
| JP | 2006-162826 | 6/2006 |
| JP | 2006-318886 | 11/2006 |

(Continued)

*Primary Examiner* — K. Cyrus Kianni
(74) *Attorney, Agent, or Firm* — McKenna Long & Aldridge, LLP

(57) ABSTRACT

There is provided a condensing film for an LCD backlight unit. The condensing film includes a base member unit; a condenser unit disposed in an upper surface of the base member unit and having unit lens groups sequentially arranged thereon, each of the unit lens group being composed of a combination of at least two lenses that are different in shape; and a reflector unit disposed in a lower surface of the base member unit and composed of an opening through which light passes and a reflective surface from which the light reflects. The condensing film configured thus may be useful to solve the problems regarding the viewing angle and the uniformity in brightness of a screen since the condensing film has a more moderate distribution of emitted light than the conventional condensing films.

13 Claims, 6 Drawing Sheets

FOREIGN PATENT DOCUMENTS

| | | |
|---|---|---|
| JP | 2006-330149 | 12/2006 |
| JP | 2007-095386 A | 4/2007 |
| JP | 2008241936 A * | 10/2008 |
| KR | 10-2006-0023452 | 3/2006 |
| KR | 10-2006-0078410 | 7/2006 |
| KR | 10-2006-0105377 | 10/2006 |
| KR | 10-2007-0052868 | 5/2007 |
| KR | 10-2007-0055131 A | 5/2007 |

* cited by examiner

CONDENSING FILM FOR LCD BACKLIGHT UNIT

TECHNICAL FIELD

The present invention relates to a condensing film for a liquid crystal display (LCD) backlight unit, and more particularly, to a condensing film for an LCD backlight unit that is designed to have a moderate distribution of emitted light so as to improve a viewing angle range of a liquid crystal display (LCD) and display an image with uniform brightness.

BACKGROUND ART

In general, a liquid crystal display (LCD) refers to a device that displays an image by injecting an liquid crystal material between a color filter substrate and a TFT-array substrate, the color filter substrate having a common electrode, a color filter and the like formed therein and the TFT-array substrate having a thin film transistor, pixel electrode and the like formed therein; changing arrangement of liquid crystal molecules by applying different potentials to the pixel electrode and the common electrode to form an electric field; and controlling transmittance of light through the orientation of the liquid crystal molecules.

Since this LCD has advantages that it is manufactured in small size and light weight, and driven at low power consumption, the LCD has received attention as an alternative image display system that may be used to solve the problems regarding to the cathode ray tube (CRT). Recently, the LCD has been used in almost all of the image display systems.

Meanwhile, since the LCD does not spontaneously emit light, a backlight unit is provided in a lower portion of the LCD panel to supply light to the LCD. In this case, the backlight unit is divided into an edge-type backlight unit and a direct-type backlight unit, depending on the position of a light source. FIGS. 1 and 2 are diagrams illustrating a configuration of a conventional LCD backlight unit. Here, FIG. 1 shows a direct-type backlight unit widely used in a large LCD, and FIG. 2 shows an edge-type backlight unit.

As shown in FIG. 1, optical films such as a diffusion plate 20, diffusion film 30 and 30 and a condensing film 40 are stacked on a light source 10 of the conventional direct-type backlight unit 1. The optical films function to shield a light source and diffuse and condense light to improve optical properties of the light emitted from the light source.

Meanwhile, the edge-type backlight unit 2 includes a light source 10, a light guide plate 50, diffusion film 30 and 30 and a condensing film 40, as shown in FIG. 2. Here, the light guide plate 50 functions to change a direction of light emitted from the light source 10 into a front direction (i.e. a direction toward a viewer).

The optical films of the backlight units may be configured more simply or more complicatedly, depending on the consumers demands, the desired use of the products, etc. For example, the lower diffusion film 30 or the upper diffusion film 30 may not be used, or two condensing films may be stacked and used, when necessary, in the backlight unit.

Among the optical films, the condensing film functions to concentrate light spreading in all directions within a viewing angle range in order to improve luminance of a screen. A prism film, a lenticular lens film or the like has been generally used as the condensing film. Recently, a lenticular lens film having a reflector layer formed in a lower surface thereof has been widely used.

FIG. 3 shows a conventional condensing film 100 including lenticular lenses and having a reflector layer formed in a lower surface thereof. As shown in FIG. 3, the condensing film 100 having a reflector layer formed therein includes lenticular lenses 120 sequentially arranged in an upper surface of a base member 110 made of a polyester (PET) film; and a reflector layer 130 formed in a lower surface of the base member 110. In this case, the reflector layer includes a reflective surface 150 and an opening 140. Here, only the light that may be condensed within the viewing angle range passes through the opening 140, and the other light reflects from the reflective surface 150.

Most of the light passed through the above-mentioned conventional condensing film is condensed and directed toward the front of a screen. Therefore, when a viewer watches the screen from sides or the top and bottom of the screen rather than the center of the screen, the brightness of the screen is gradually diminished since the intensity of light directed toward the viewer becomes lower, which leads to the lack of uniformity in brightness of the screen in up and down or left and right directions.

FIG. 4 is a graph illustrating the changes in luminance according to the viewing angle of the conventional condensing film. As shown in FIG. 4, it might be revealed that the luminance of the conventional condensing film is high in the vicinity of a viewing angle of 0 to 20° but is suddenly diminished out of the viewing angle range. The use of the conventional condensing film results in very narrow viewing angle range of a screen. This phenomenon becomes more serious when a thickness of the base member is similar to, or higher than a lens pitch of the lenticular lens. Therefore the emitted light in the condensing film should be distributed more moderately so as to improve a viewing angle range of LCD and display an image with uniform brightness.

DISCLOSURE OF INVENTION

Technical Problem

The present invention is designed to solve the problems of the prior art, and therefore it is an object of the present invention to provide a condensing film for an LCD backlight unit in which a distribution of emitted light is controlled to a moderate level, the condensing film being able to improve a viewing angle range of an LCD and display an image with uniform brightness.

Technical Solution

According to an aspect of the present invention, there is provided a condensing film for a liquid crystal display (LCD) backlight unit including a base member unit; a condenser unit disposed in an upper surface of the base member unit and having unit lens groups sequentially arranged thereon, each of the unit lens group being composed of a combination of at least two lenses that are different in shape; and a reflector unit disposed in a lower surface of the base member unit and composed of an opening through which light passes and a reflective surface from which the light reflects.

Here, each of the unit lens groups may include one lenticular lens and a plurality of prism lenses. In this case, the unit lens group may have lenticular lenses disposed in the center thereof; and has prism lenses disposed in both sides of the lenticular lenses.

Also, a number ratio of the lenticular lenses to the prism lenses in the unit lens groups may be in a range from 1:1 to 1:4.

In addition, the unit lens group may have a width of approximately 100 to 300 μm (micrometer), a lens pitch of the lenticular lenses may account for 50 to 90% of a width of the unit lens groups, and a height of the lenticular lens may amount for approximately 20 to 50% of the lens pitch of the lenticular lenses. Also, a vertical angle of the prism lenses may be in a range from 70 to 100° (degree).

Additionally, the condensing film may include a light diffuser formed therein. In this case, the light diffuser may be selected from the group consisting of polymethylmethacrylate (PMMA), polystyrene, polybutadiene and copolymers thereof, and silica.

Furthermore, the base member unit may be selected from the group consisting of a polyester film, a polyvinyl chloride film, a polycarbonate film, a polymethylmethacrylate film, a polystyrene film, a polyesther sulfone film, a polybutadiene film, a polyether ketone film and a polyurethane film, and the condenser unit and the reflector unit may be made of a curable resin. In this case, the curable resin may be selected from the group consisting of urethane acrylate, epoxyacrylate, esteracrylate and a radical-forming monomer, and they may be used alone or in combinations thereof.

According to another aspect of the present invention, there is provided a direct-type or edge-type backlight unit including the condensing film.

According to still another aspect of the present invention, there is provided a liquid crystal display including the condensing film.

Advantageous Effects

As described above, the condensing film according to one exemplary embodiment of the present invention may be useful to widen a viewing angle range of the LCD and display an image with uniform brightness by sequentially arranging unit lens groups, each of which includes a plurality of lenses that are different in shape, on the condensing film to moderately distribute emitted light in the condensing film.

Also, according to one exemplary embodiment of the present invention, since the condenser unit and the reflector unit are made of a curable resin, the condensing film may be manufactured by a simple process and be easy to manufacture, and the light diffuser may also be easily mounted in the condensing film.

Furthermore, when the light diffuser is included inside the condensing film, only one optical film may be used to perform both of a diffusion function and a light condensing function. Therefore, the condensing film according to one exemplary embodiment of the present invention may be useful to reduce the number of optical films used in the backlight unit, simplify the manufacturing process and reduce the production cost due to the reduced number of the optical films.

BEST MODE FOR CARRYING OUT THE INVENTION

The present inventors have made ardent attempts to manufacture a condensing film having an improved optical properties and a moderate distribution of emitted light, and concluded that it is difficult to improve the distribution of emitted light when lenses having a single shape are used in the condensing film. Thus, they have found that the solution to the above-mentioned problems is possible by sequentially arranging unit lens groups, each of which includes a plurality of lenses that are different in shape, on the condensing film. Therefore, the present invention was completed on the basis of the above facts.

Hereinafter, exemplary embodiments of the present invention will be described in more detail.

Figure 1:
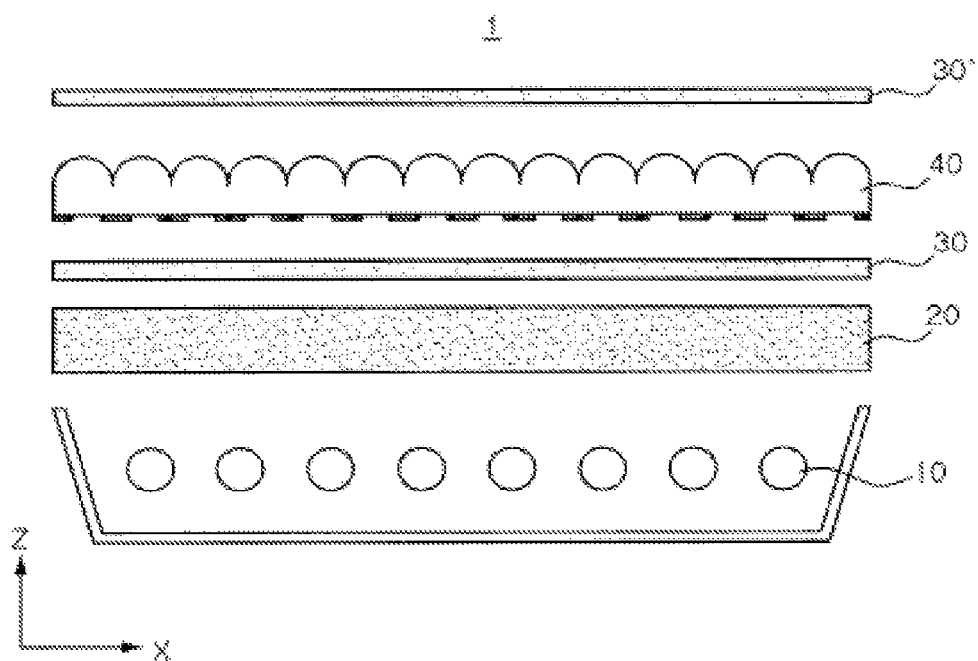
FIG. 1 is a diagram illustrating a configuration of a conventional direct-type backlight unit.
Figure 2:
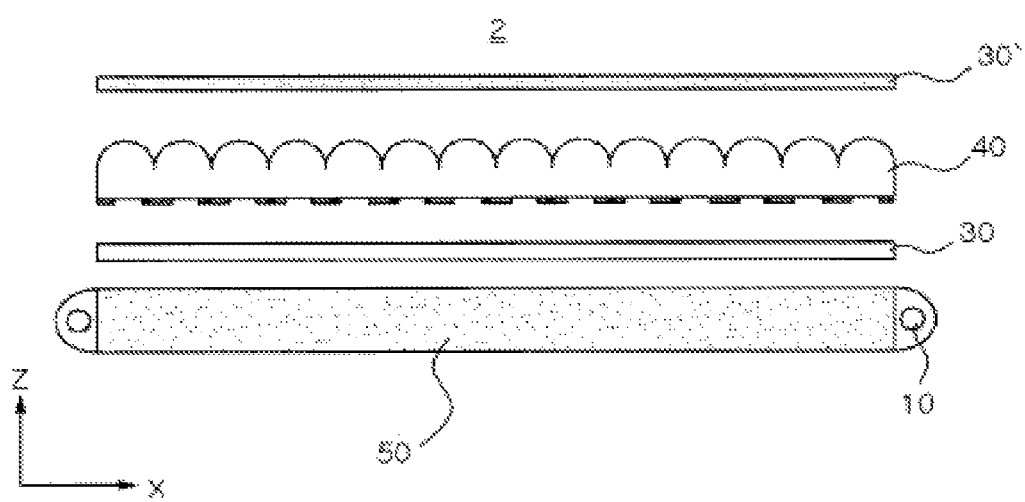
FIG. 2 is a diagram illustrating a configuration of a conventional edge-type backlight unit.
Figure 3:
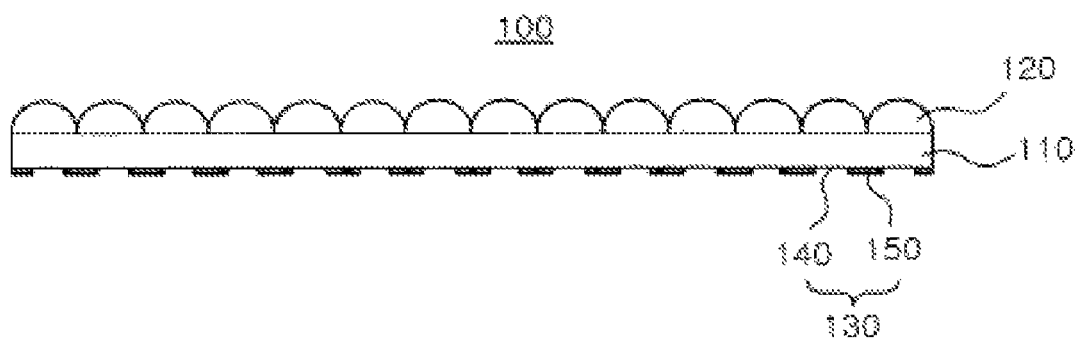
FIG. 3 is a diagram illustrating a configuration of a conventional condensing film.
Figure 4:
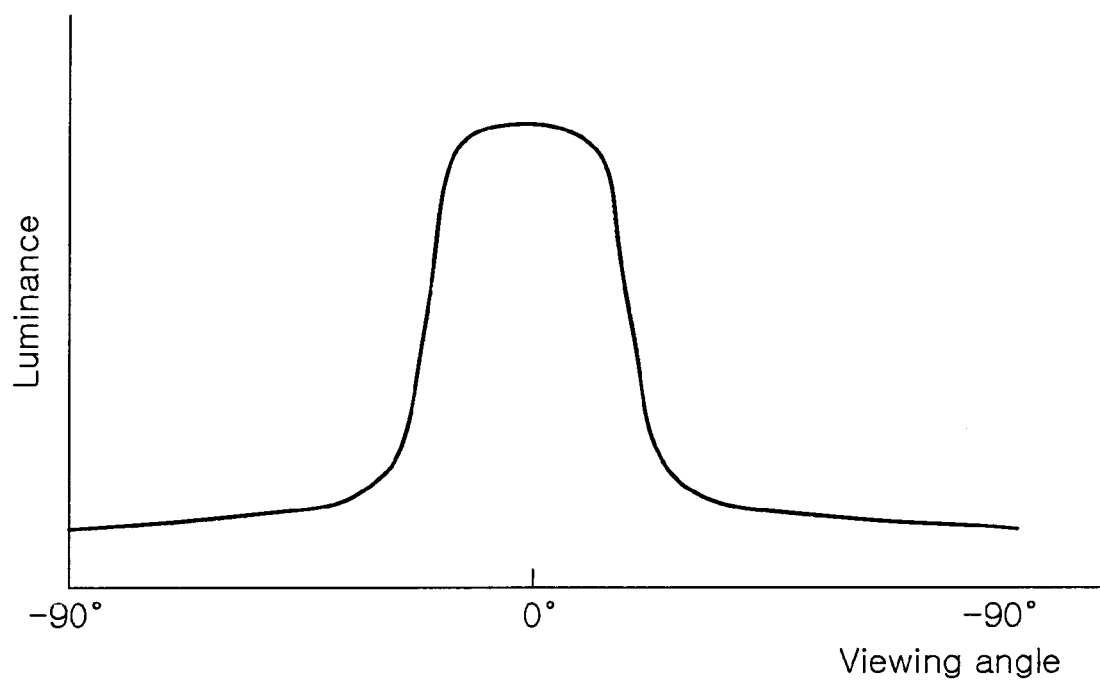
FIG. 4 is a graph illustrating a distribution of emitted light according to the viewing angles of the conventional condensing film.
Figure 5:
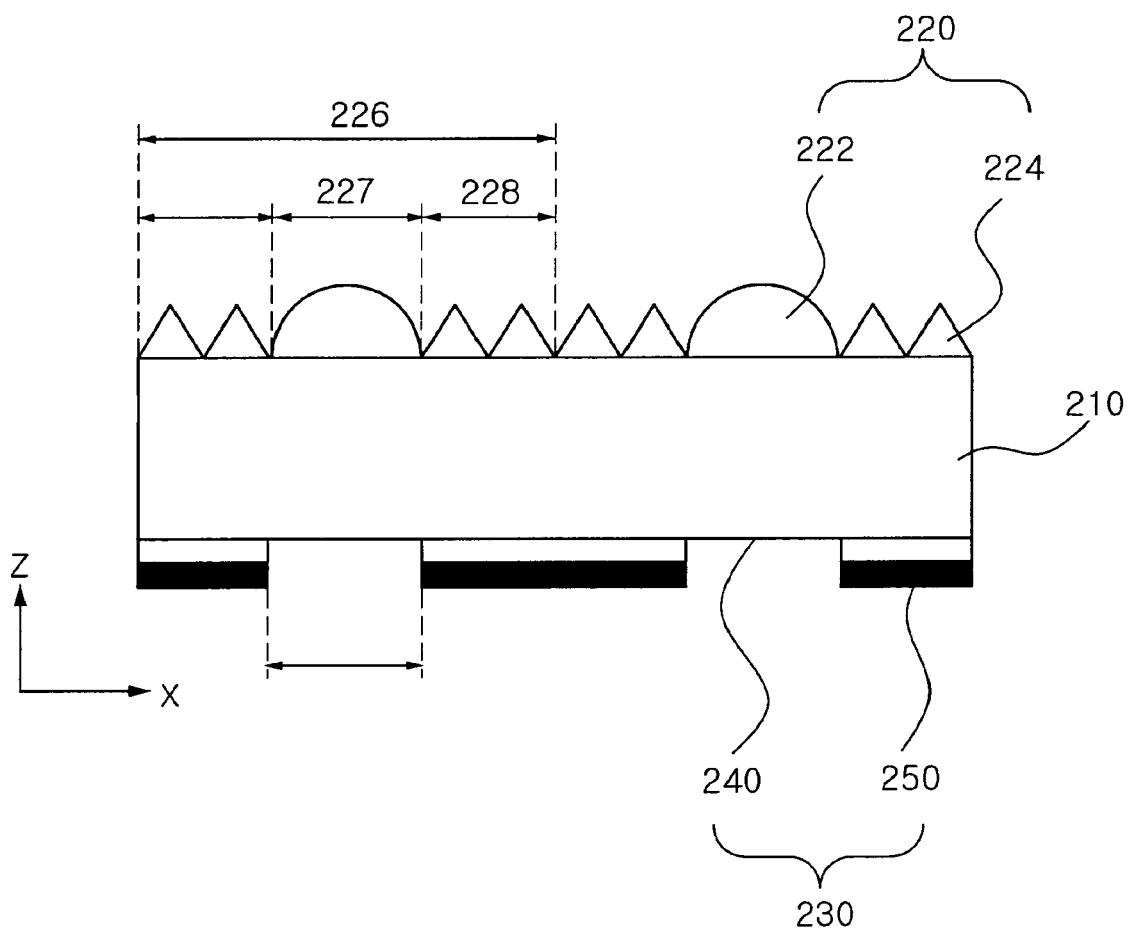
FIG. 5 is a cross-sectional view illustrating a configuration of a condensing film awarding to one exemplary embodiment of the present invention.

FIG. 5 shows a condensing film awarding to one exemplary embodiment of the present invention. One exemplary embodiment of the present invention will be described in more detail with reference to FIG. 5.

As shown in FIG. 5, the condensing film 200 according to one exemplary embodiment of the present invention includes a base member unit 210, a condenser unit 220 and a reflector unit 230.

1. Base Member Unit 210

The base member unit 210 functions to support a condenser unit 220 and a reflector unit 230, both of which will be described later, and is generally composed of a polymer film. For example, the base member unit 210, which may be used herein, includes polymer films such as a polyester film, a polyvinyl chloride film, a polycarbonate film, a polymethylmethacrylate film, a polystyrene film, a polyesther sulfone film, a polybutadiene film, a polyether ketone film, a polyurethane film, and the like.

Meanwhile, according to the present invention, a thickness of the base member unit is preferably proportional to a lens pitch of the unit lens group. That is to say, when the unit lens group has a width of 200 μm (micrometer), it is suitable for the base member unit to have a thickness of approximately 125 to 188 μm (micrometer), and the base member unit preferably has a thickness of approximately 62.5 to 94 μm (micrometer) when the unit lens group has a width of 100 μm (micrometer).

When a ratio of a thickness of the base member unit to a width of the unit lens group is excessively high, the intensity of light entering the condenser unit is diminished, which leads to the deteriorated optical efficiency. On the contrary, when the ratio of the thickness of the base member unit to the width of the unit lens group is excessively low, mechanical properties of the optical film may be deteriorated and it is difficult to manufacture the optical film. Therefore, the optimum effects may be obtained in the present invention by controlling a thickness of the base member unit according to the width of the unit lens group.

2. Condenser Unit 220

The condenser unit 220 functions to condense light so as to improve brightness of a screen within a viewing angle range, and is formed by sequentially arranging unit lens groups, each of which is composed of a combination of at least two lenses that are different in shape.

The unit lens group according to one exemplary embodiment of the present invention is composed of a combination of lenses that are different in shape. In this case, the respective lenses that may be used to form the unit lens group includes, but are not limited to, a lenticular lens, a prism lens, a trapezoid prism, etc.

Also, the unit lens group is preferably formed so that it can have a symmetric structure, and particularly preferably formed so that its center of symmetry can be matched with the center of an opening in a reflector unit as described later. When the shape of the unit lens group is asymmetrical with respect to the center of the unit lens group, the distribution of emitted light may be leaned to one side, which leads to the lack of uniformity and brightness in an image.

Since the condenser unit according to one exemplary embodiment of the present invention includes lenses that are different in shape, the light emitted from the lenses has a different light condensing shape. Therefore, it is possible to obtain a condenser unit having a moderate distribution of emitted light, compared to the conventional condensing film in which lenses with the same shape are sequentially arranged.

Meanwhile, the distribution of emitted light may be varied according to the shape, pitch, height, angle and number of the used lens, and the width of the unit lens group, etc. As a result, a condensing film having various distributions of emitted light may be manufactured under the control of the shape, pitch, height, angle and number of the used lens and the width of the unit lens group.

FIG. 5 shows a condensing film according to one exemplary embodiment of the present invention. As shown in FIG. 5, the unit lens group 226 according to an exemplary embodiment of the present invention may be composed of a combination of at least one lenticular lens 222 and at least one prism lens 224.

In this case, the lenticular lenses 222 are preferably disposed on the center of the unit lens group 226, and the same number of the prism lenses 224 are preferably disposed in both sides of the lenticular lenses. In this case, a width of one unit lens group 226 is preferably in a range of approximately 100 to 300 μm (micrometer).

Also, a number ratio of the lenticular lenses to the prism lenses in the unit lens group is preferably in a range of approximately 1:1 to 1:4. When the number of the prism lenses exceeds the number ratio range, the prism unit is too small in size, which leads to the deteriorated light condensing and use efficiencies.

Meanwhile, a lens pitch of the lenticular lens preferably amounts for approximately 50 to 90% of the width of the unit lens group, and a total width of a prism groups in an unit lens group preferably amounts for approximately 10 to 50% of the width of the unit lens group. When the lens pitch of the lenticular lens is less than 50% in respect to the width of the unit lens group, the luminance in a screen may be low due to the low light condensing efficiency. On the contrary, the distribution of emitted light is slightly moderate when the lens pitch of the lenticular lens exceeds 90% in respect to the width of the unit lens group.

Meanwhile, a vertical angle of the prism lens is preferably in a range of approximately 70 to 100° When the vertical angle of the prism lens is out of the vertical angle range, the light that enters the condenser unit through an opening may not form a desirable emission angle.

Meanwhile, although not shown in the drawings, a trapezoid prism lens may be used instead of the prism lens, when necessary. The trapezoid prism has a flat peak formed in the prism lens. Therefore, a user may obtain a distribution of emitted light that is different from the use of the prism lens by using the trapezoid prism lens instead of the prism lens. In the trapezoid prism lens, a width of a flat peak (top side) is preferably less than 50% of a width of a lens pitch (bottom side).

In the condensing film 200 as configured thus, the distribution of emitted light is widely varied according to the pitch of the lenticular lens 227, the width of the prism group 228, the shape of the lenticular lens, the number of the prism, the angle of the prism, the thickness of the base member unit, the size of the reflector unit opening, etc. By suitably adjusting the above-mentioned factors of the prism lenses and lenticular lenses, a condensing film having a desired distribution of emitted light may be manufactured by those skilled in the art.

Meanwhile, the condenser unit 220 may be manufactured with a curable resin, and the curable resin includes urethane acrylate, epoxyacrylate, esteracrylate, a radical-forming monomer and the like, and they may be used alone or in combinations thereof.

The condenser unit 220 may be formed by pouring a solution of the curable resin between the base member unit 210 and a mold engraved with a desired pattern and curing the solution. Therefore, the condenser unit 220 having various shapes, heights and pitches may be formed by employing molds prepared in suitable shapes, heights and pitches.

3. Reflector Unit 230

The reflector unit 230 functions to cut off light moving toward paths that do not condense the light, and transmit only the light that can condense the light within a viewing angle range in order to improve the light use efficiency and the optical properties. In this case, the reflector unit 230 is composed of a opening 240 transmitting light, and a reflective surface 250 cutting off the light.

Among the light entering from a lower portion of the condensing film awarding to the present invention, the light transmitted through the opening 240 of the reflector unit 230 is condensed by the lenticular lenses and prisms of the condenser unit. When the condensing film does not have a reflector unit, the light may be transmitted through other regions rather than the opening. However, the light transmitted through other regions rather than the opening moves through a path in which the condenser unit cannot condense the light within a viewing angle range. Therefore, since a reflector unit having an opening is installed in the condensing film according to one exemplary embodiment of the present invention, the condensing film may be used to improve the light use efficiency by transmitting light selectively, followed by condensing the transmitted light and reflecting and recycling the other light.

Meanwhile, the reflector unit 230 according to an exemplary embodiment of the present invention is preferably formed in a concavo-convex shape, as shown in FIG. 5. When the reflector unit 230 is formed in a concavo-convex shape, a reflective surface may be simply formed by applying a reflective ink to a convex region. Therefore, the reflector unit 230 has an advantage that it is easy to form a reflective surface 250, compared to the conventional condensing films.

The reflector unit 230 may also be formed of a curable resin. In this case, the curable resin includes, but is not particularly limited to, urethane acrylate, epoxyacrylate, esteracrylate, a radical-forming monomer, and the like, and they may be used alone or in combinations thereof.

A method for forming a reflector unit 230 is substantially identical to the method for forming a condenser unit. That is to say, the reflector unit 230 is formed by pouring a curable resin between a lower surface of the base member unit 210 and a mold engraved with a desired pattern (i.e. a concavo-convex pattern), and curing the curable resin. However, the method for forming a reflector unit 230 further requires an operation of forming a reflective surface, for example, coating a convex region of the reflector unit with a reflective ink, after the curable resin is completely cured.

Meanwhile, the condensing film warding to one exemplary embodiment of the present invention may include a light diffuser formed therein. The condensing film including the light diffuser may be prepared by mixing diffuser particles with a curable resin used to form the reflector unit and/or the condenser unit, the diffuser particles having a different refractive index from the curable resin, followed by forming a reflector unit and/or a condenser unit from the diffuser particles-containing curable resin. In this case, an amount of the added light diffuser is preferably in a range of 5 to 30% by weight, based on the total weight of the curable resin.

The light diffuser, which may be used in the present invention, includes polymethylmethacrylate (PMMA), polystyrene, polybutadiene and copolymers thereof, and silica, etc.

When the light diffuser is included in the condensing film as described above, the light passed through the condensing film is scattered and diffused by the diffuser particles. Therefore, the luminance distribution of light is smooth and the optical properties are improved without the use of the additional diffusion film.

Also, since one optical film is used to perform both of a diffusion function and a light condensing function, the optical films used in the backlight unit may be decreased in number, which leads to the simple manufacturing process and the reduced production cost.

Also, the present invention provides a backlight unit including the above-mentioned condensing film according to one exemplary embodiment of the present invention. The backlight unit according to one exemplary embodiment of the present invention may be a direct-type backlight unit that includes a light source having linear lamps arranged therein at predetermined distances; a diffusion plate uniformly diffusing light emitted from the light source so as to make the brightness of a screen uniform; and a condensing film cording to one exemplary embodiment of the present invention, or be an edge-type backlight unit that includes an edge-type light source; a light guide plate changing a direction of light emitted from the light sources to a front direction; and a condensing film according to one exemplary embodiment of the present invention. In this case, a diffusion film may be further provided in an upper and/or lower portion of the condensing film in the backlight unit awarding to one exemplary embodiment of the present invention.

Also, the present invention provides a liquid crystal display including the above-mentioned condensing film awarding to one exemplary embodiment of the present invention. The liquid crystal display according to one exemplary embodiment of the present invention includes a liquid crystal panel including a color filter substrate, a TFT-array substrate and a liquid crystal cell disposed between the color filter substrate and the TFT-array substrate; and a direct-type backlight unit including a light source having linear lamps arranged therein at predetermined distances, a diffusion plate uniformly diffusing light emitted from the light source so as to make the brightness of a screen uniform and a condensing film according to one exemplary embodiment of the present invention. Also, the liquid crystal display according to one exemplary embodiment of the present invention includes a liquid crystal panel including a color filter substrate, a TFT-array substrate and a liquid crystal cell disposed between the color filter substrate and the TFT-array substrate; and an edge-type backlight unit including an edge-type light source, a light guide plate changing a direction of light emitted from the light sources to a front direction (i.e. a direction toward a viewer) and a condensing film according to one exemplary embodiment of the present invention. In the liquid crystal display according to one exemplary embodiment of the present invention, a diffusion film may be provided in an upper and/or lower portion of the condensing film awarding to one exemplary embodiment of the present invention.

Mode for the Invention

Hereinafter, the present invention will be described in more detail with reference to the following Examples. However, it should be understood that the description proposed herein is just a preferable example for the purpose of illustrations only, not intended to limit the scope of the invention.

Example

A PET film having a thickness of 188 μm (micrometer) was used as a base member. A condenser unit having unit lens groups sequentially arranged therein was formed by pouring an acrylic UV-cured resin between a mold and a base member and curing the acrylic UV-cured resin, each of the unit lens groups being composed of one lenticular lens and 4 prism lenses, and the acrylic UV-cured resin having a refractive index of approximately 1.53. In this case, the lenticular lenses were disposed in the center of the unit lens group, and two prism lenses were disposed in both sides of the lenticular lenses. In this case, the lenticular lenses had a pitch of 120 μm (micrometer) and a height of 37 μm (micrometer), an angle (an angle between two facing-up planes of the prism) of the prism was 90°, a pitch of a single prism was 20 μm (micrometer), and a width of one unit lens group was 200 μm (micrometer).

Next, a reflector unit having an opening pitch of 84 μm was formed in a lower surface of the base member (a PET film) by pouring a curable resin between the mold and the base member and curing the curable resin. A reflective surface was formed by applying a reflective ink onto a convex surface of the reflector unit.

Comparative Example

A PET film having a thickness of 125 μm (micrometer) was used as a base member. A condenser unit having lenticular lenses sequentially arranged therein was formed by pouring an acrylic UV-cured resin between a mold and a base member and curing the acrylic UV-cured resin, each of the lenticular lenses having a pitch of 200 μm (micrometer) and a height of 75 μm (micrometer), and the acrylic UV-cured resin having a refractive index of approximately 1.53.

Next, a reflector unit having an opening pitch of 84 μm (micrometer) was also formed in a lower surface of the base member by pouring a curable resin between the mold and the base member and curing the curable resin. A reflective surface was formed by applying a reflective ink onto a projecting surface of the reflector unit.

Experimental Example

Measurement of Distribution of Emitted Light

Figure 6:
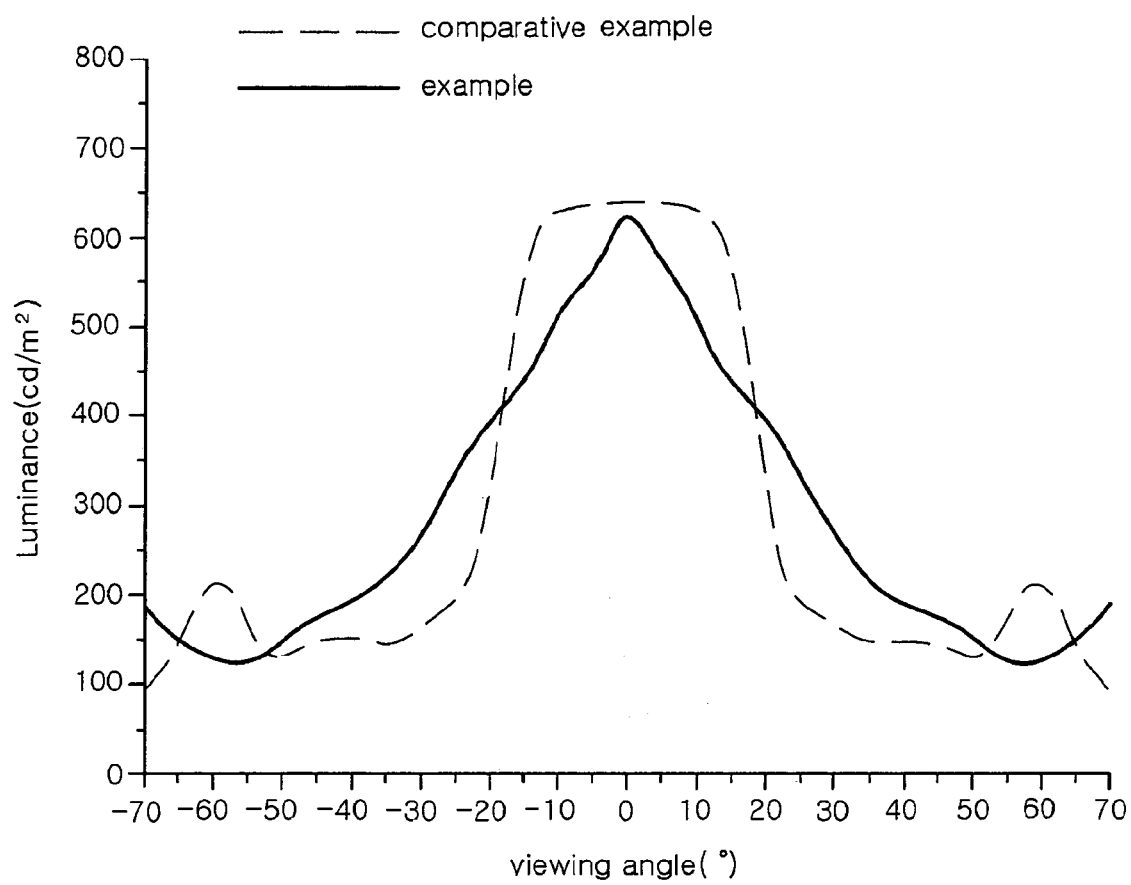
FIG. 6 is a graph illustrating distributions of emitted lights according to the viewing angles of the condensing films described in Example and Comparative example.

The condensing films prepared in the methods described in Example and Comparative example were staked on a diffusion plate of a direct-type backlight unit, and measured for luminance of emitted light wording to the viewing angles by using an EZContrast™ (ELDIM). The results are shown in FIG. 6. As shown in FIG. 6, it was revealed that the condensing film of Example shows a moderate change in luminance, compared to the condensing film of Comparative example.

The invention claimed is:

1. A condensing film for a liquid crystal display (LCD) backlight unit, comprising:
    a base member unit;
    a condenser unit disposed in an upper surface of the base member unit and having unit lens groups sequentially arranged thereon; and
    a reflector unit disposed in a lower surface of the base member unit and composed of an opening through which light passes and a reflective surface from which the light reflects, and
    wherein each of the unit lens groups has lenticular lenses disposed in the center thereof and has an identical number of prism lenses disposed on both sides of the lenticular lenses,
    a lens pitch of the lenticular lenses accounts for 50 to 90% of a width of the unit lens group, and
    each of the unit lens groups has a symmetric structure, and the center of symmetric structure is matched with the center of an opening in the reflector unit.

2. The condensing film of claim 1, wherein a number ratio of the lenticular lenses to the prism lenses in each of the unit lens groups is in a range from 1:1 to 1:4.

3. The condensing film of claim 1, wherein a vertical angle of the prism lenses is in a range from 70 to 100°.

4. The condensing film of claim 1, wherein the condenser unit and/or the reflector unit comprise a light diffuser formed therein.

5. The condensing film of claim 4, wherein the light diffuser is selected from the group consisting of polymethylmethacrylate(PMMA), polystyrene, polybutadiene and copolymers thereof, and silica.

6. The condensing film of claim 1, wherein the base member unit is selected from the group consisting of a polyester film, a polyvinyl chloride film, a polycarbonate film, a polymethylmethacrylate film, a polystyrene film, a polyester sulfone film, a polybutadiene film, a polyether ketone film and a polyurethane film.

7. The condensing film of claim 1, wherein the condenser unit and the reflector unit are made of a curable resin.

8. The condensing film of claim 7 wherein the curable resin is selected from the group consisting of urethane acrylate, epoxyacrylate, esteracrylate, a radical-forming monomer and combinations thereof.

9. The condensing film of claim 1, wherein the reflector unit is formed in an concavo-convex shape.

10. A direct-type backlight unit, comprising:
    a light source having linear lamps arranged therein at predetermined distances; a diffusion plate uniformly diffusing light emitted from the light source so as to make the brightness of a screen uniform; and
    a condensing film defined in claim 1.

11. An edge-type backlight unit, comprising:
    an edge-type light source;
    a light guide plate changing a direction of light emitted from the light sources to a front direction; and
    a condensing film defined in claim 1.

12. A liquid crystal display, comprising;
    a liquid crystal panel including a color filter substrate, a TFT-array substrate and a liquid crystal cell disposed between the color flier substrate and the TFT-array substrate; and
    a direct-type backlight unit comprising a light source having linear lamps arranged therein at predetermined distances, a diffusion plate uniformly diffusing light emitted from the light source so as to make the brightness of a screen uniform and a condensing film defined in claim 1.

13. A liquid crystal display, comprising:
    a liquid crystal panel including a color filter substrate, a TFT-array substrate and a liquid crystal cell disposed between the color filter substrate and the TFT-array substrate; and
    an edge-type backlight unit including an edge-type light source, a light guide plate changing a direction of light emitted from the light sources to a front direction, and a condensing film defined in claim 1.

* * * * *